May 24, 1927.

G. M. STEVENSON

1,629,813

PROCESS OF AND MACHINE FOR MAKING FERRULES

Filed May 20, 1925

Inventor
George M. Stevenson

Cooper C. Browne
Attorney

May 24, 1927.

G. M. STEVENSON

1,629,813

PROCESS OF AND MACHINE FOR MAKING FERRULES

Filed May 20, 1925

Inventor
George M. Stevenson
Eugene C. Brown
Attorney

Patented May 24, 1927.

1,629,813

UNITED STATES PATENT OFFICE.

GEORGE M. STEVENSON, OF BALTIMORE, MARYLAND.

PROCESS OF AND MACHINE FOR MAKING FERRULES.

Application filed May 20, 1925. Serial No. 31,836.

This invention relates to a process and machine for making the metallic ferrules used on paint brushes.

Among the important objects of the invention are to provide a novel process wherein substantially flat blanks are bent to the proper ferrule shape and their edges locked together by successive operative steps; to provide an improved general construction of machine for carrying out this process; to provide novel means in such a machine for effecting the preliminary forming of the ferrule to its general shape; to provide in such a machine, an improved arrangement for locking the edges of the ferrule into position for the seam forming mechanism; to provide novel seam forming mechanism in connection with the machine; to provide novel feeding means cooperating with the other mechanisms, and other objects as will be hereinafter apparent.

In general the process contemplates successive steps whereby a locked seam may be formed without the use of solder and a machine wherein these steps can be carried out in a successful and commercial manner.

Such a machine and process will now be described in detail, and specifically claimed, reference being had to the accompanying drawings herein.

In the construction of a typical machine for this purpose (see Figs. 27 and 28) there is preferably employed a main frame including a base 10. Extending upwardly from the forward end of this base is a pair of front frame legs 11 wherein is journalled a transverse shaft 12 carrying at one end a drive pulley 13 which may be belted to any suitable source of power, the shaft 12 thus constituting the main drive shaft of the machine. On this main drive shaft is mounted a bevel gear 14 which meshes with a bevel gear 15 fixed on a longitudinally extending shaft 16 supported at its forward end in a front bearing member 17 and at its rear end in a rear frame member 18. This shaft 16 carries, at its rear end, a bevel gear 19 which meshes with a bevel gear 20 fixed on a rear vertical shaft 21 supported in a vertical bearing member 22 and carries, at its upper end, a crank disk 23. This crank disk is connected by a horizontally disposed pitman or connecting rod 24 with a head 25 carried by a downwardly extending arm 26 depending from a feeder bar 27 supported for guided longitudinal reciprocating movement in the frame top 28. At intervals along this feeder bar 27 are provided pockets 28 wherein are pivoted the feeder fingers 29, the rear ends of these fingers being pivoted in the respective pockets while the forward ends thereof are held in normal raised position by springs 30 each arranged between the bottom of a respective pocket and the free end of the corresponding finger. Thus the reciprocation of these feeder bars serves to feed the blanks to be operated on from a suitable magazine (not shown) toward the front end of the machine.

Figure 27:
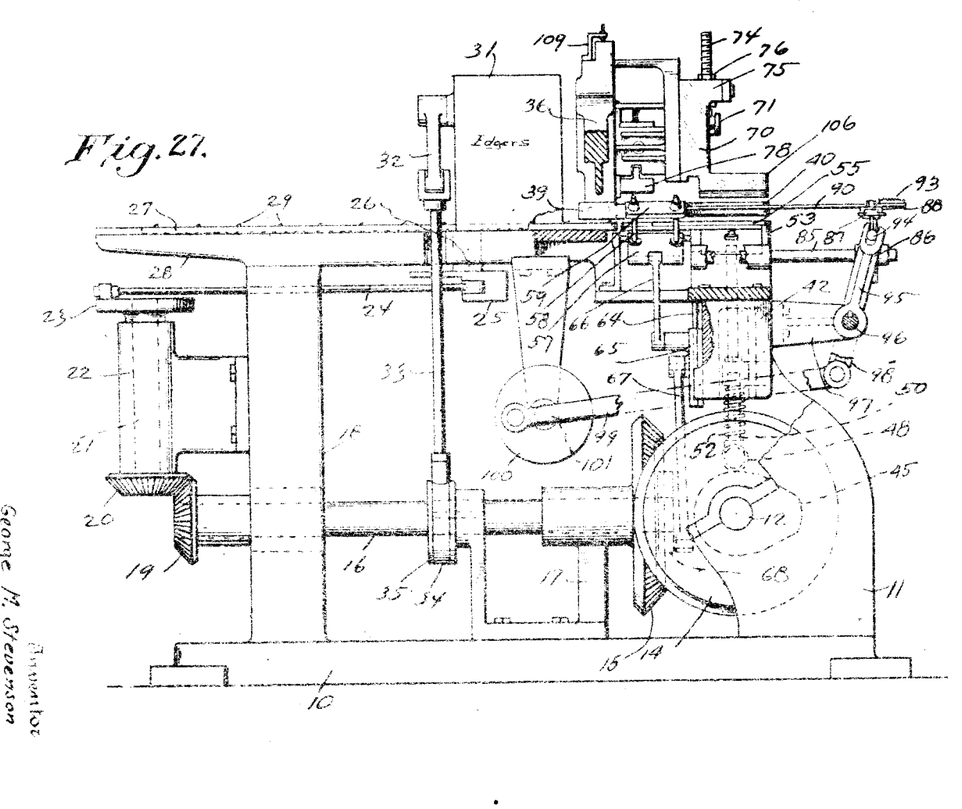
Fig. 27 is a side view of the machine partly diagrammatic many of the parts being omitted to show more clearly the operation of the remainder.
Figure 28:
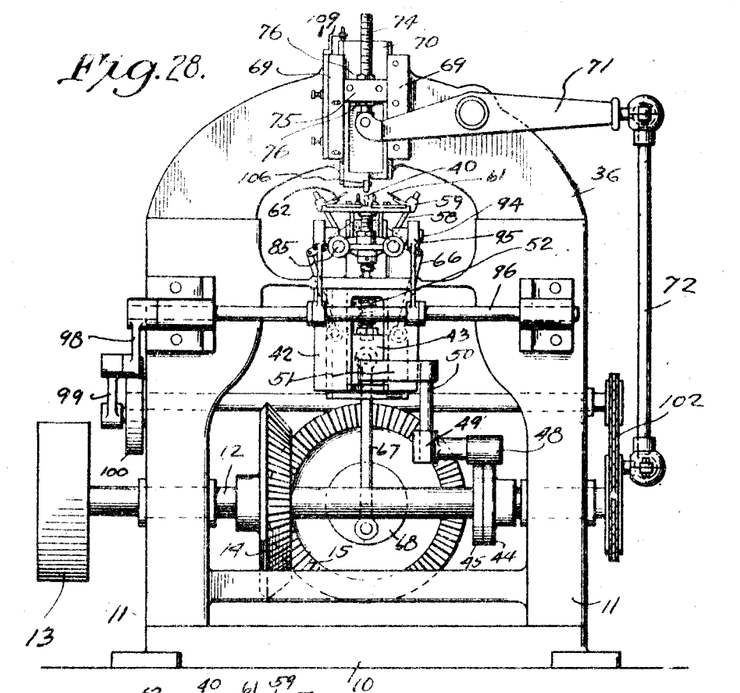
Fig. 28 is a front view of the machine also partly diagrammatic.
Figures 29, 30:
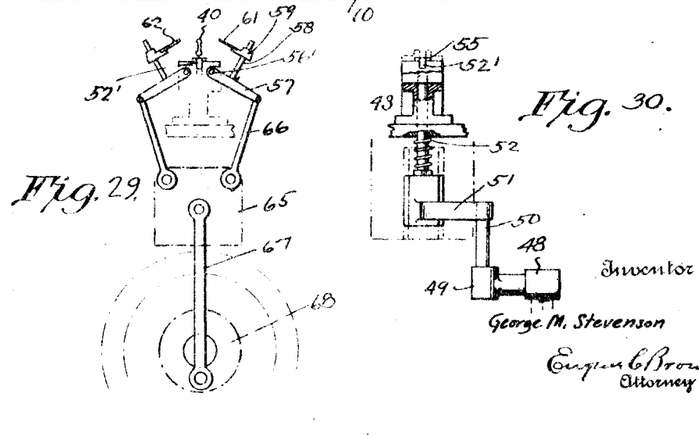
Fig. 29 is a view of the wing operating mechanism shown diagrammatically.
Fig. 30 is a view of the former mechanism also shown diagrammatically.

In their forward movement these blanks pass beneath an edger 31 (see Fig. 27). Inasmuch as the mechanism of such an edger is, in itself, old and well known and, as the specific edger construction forms no part of the present invention, it is not deemed necessary either to show or describe the details of its mechanism further than to say that it is operated in unison with the remainder of the mechanism by means of a rock arm 32 connected by a rod 33 with an eccentric strap 34 surrounding an eccentric 35 fixed on the shaft 16. However, it will be well to note that the gears 19 and 20 have the same number of teeth, being miter gears, so that with each reciprocation of the feeder bars the edger operates to perform the necessary stamping and preliminary crimping operations on the blank which, for the present purpose leave it in the form shown at B in Figure 11, it being of course understood that suitable dies are employed for this purpose.

Figures 3, 4, 11, 12:
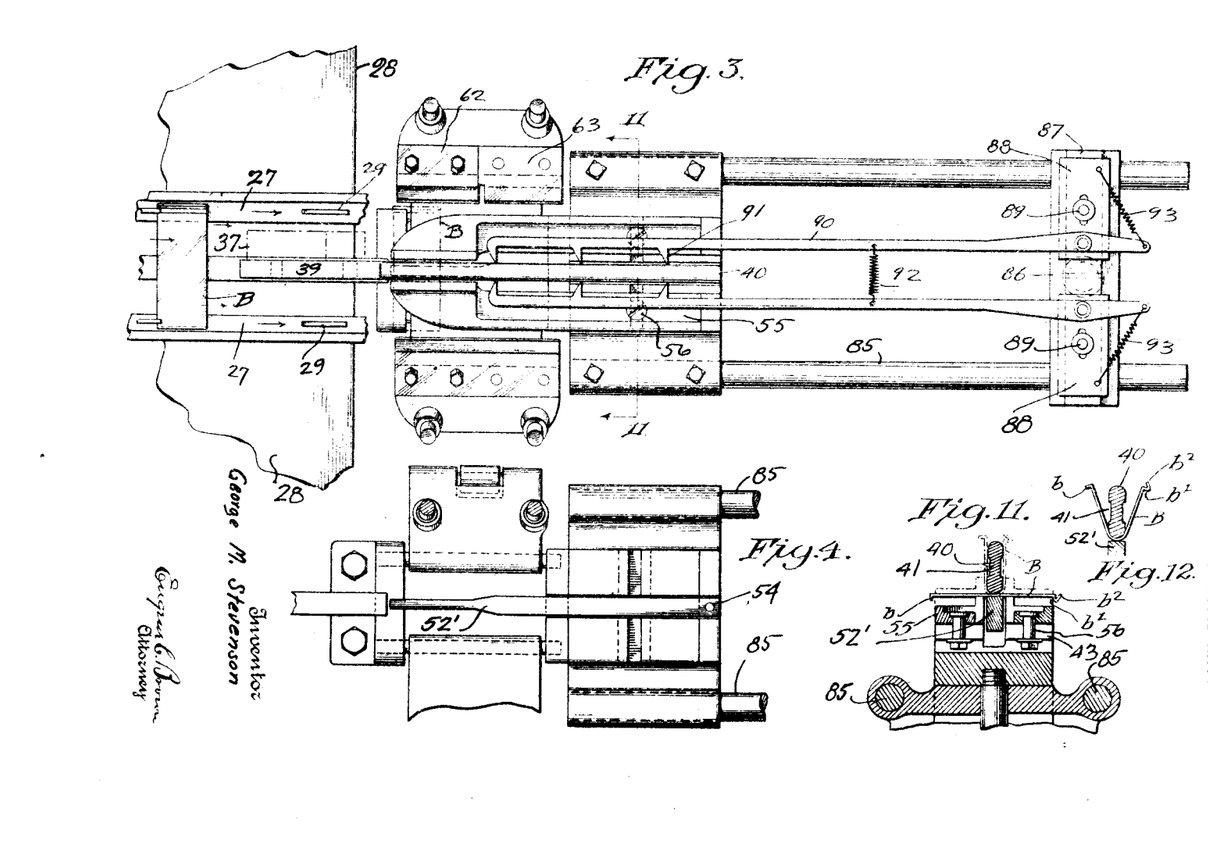
Fig. 3 a section on line 3—3 of Fig. 1 showing formers and pull bar.
Fig. 4 is a section on line 4—4 of Fig. 1 with formers and pull bars removed.
Fig. 11 is a section on the line 11—11 of Fig. 3, showing the operation of the formers.
Fig. 12 shows the condition of the ferrule blank after the formers have returned to their bed.

In order to understand the further steps in the production of the device and the operation of the machine, it will be well to note that the blank, after passing the edger, consists essentially of a rectangular strip of sheet metal having its longer dimension arranged transversely of its path of travel from front to back of such machine. Moreover, one end edge of the blank is bent, by the action of the edger, downwardly with respect to the body as at $b$, while the opposite end edge is bent, first downwardly as at $b'$ at right angles to the body and then upwardly as at $b^2$ at an acute angle to the part $b'$ as shown in Fig. 11.

Figures 1, 2:
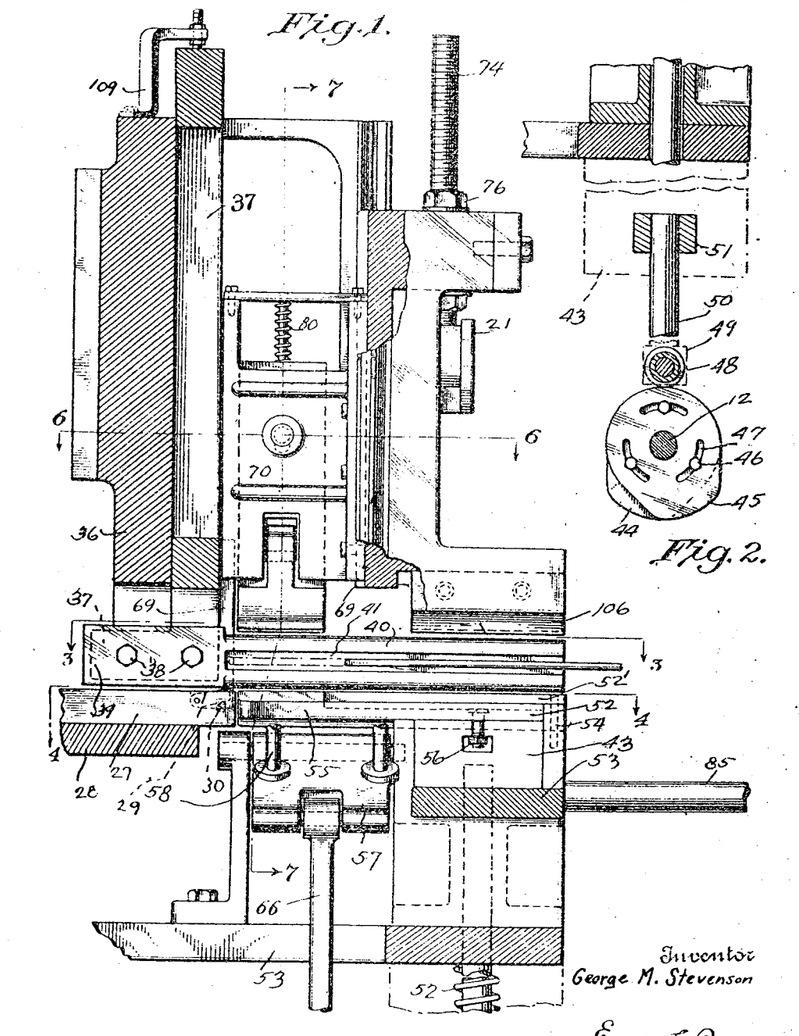
Fig. 1 is a side view of the pincher mechanism.
Fig. 2 a side view of the cam and tappet for operating the anvil block formers.

To consider now the first bending operations and the mechanism for accomplishing the same. On top of the frame top is supported an arch 36. This arch carries a supporting slide 37 whereto is attached, by means of bolts 38 the rear end 39 of a horn 40 which extends forwardly toward the front of the machine and which is provided on its sides with channels 41. This horn has its upper and lower surfaces rounded and constitutes the sizing device of the machine as well as the form on which the ferrules are made. The horn passes between a series of devices which operate in such manner as to bend the blank B into proper ferrule form and bring its edges into locking relation. In order to do this there is provided, at the forward end of the machine, a vertical guide 42 wherein is slidably mounted an anvil stand 43. This anvil stand is caused to reciprocate in the following manner. On the shaft 12 is a cam, which consists of a plate 44 fixed to said shaft and a second plate 45 which is revoluble on said shaft and is held against the plate 44 by means of bolts 46 passing through slots 47 concentric to the shaft 12. By reference to Figure 2, it will be seen that the shifting of the plate 45 varies the dwell of the cam. For instance, referring to that figure, if the bolts 46 are loosened and the plate 45 shifted in a clockwise direction the lower arc of the cam as a whole is shortened. Accordingly the dwell of the cam may be thereby regulated, the plate 45 being shifted clockwise for a shorter dwell and being shifted anti-clockwise for a longer dwell. This cam bears against a roller 48 which is carried on an arm 49 fixedly mounted on a rod 50 projecting downwardly from an extension 51 of a block 51′ from which projects a rod 51ª slidable in the anvil stand 43. Now, since the rod 51ª slides in the anvil stand provision must be made to cause movement of the rod to move the anvil stand. To this end spring 52 is interposed between the block 51, and the anvil stand. Thus each rotation of the shaft 12 causes a rotation of the cam and, the setting of the cam determines the duration of the upward movement of the rod 50. Thus each rotation of the shaft 12 tends to lift the stand the full throw of the cam but, since the spring 50′ is interposed as described, the stand only lifts to such position as to fold the blank. Extending longitudinally beneath the horn is a bar 52, the bar being supported on the under frame 53. A loose dowel 54 serves to hold the front end while the middle portion supported in a suitable notch in said frame. This bar is so positioned as to just allow sufficient room for the metal of the blank to slide in the space provided, upon the horn rising to its full extent, this being regulated by stop 109 (see Figs. 1 and 28). On the anvil stand 43 is mounted a pair of folder arms 55, these arms being secured in place by suitable bolts 56 so they can be adjusted for width. The rear ends of these arms curve inwardly as can be seen by reference to Figure 3. These rear ends are positioned at what may be termed the first station of the blank. When the fingers 29 feed the blank to this station on the forward motion on the feeder bars they leave it in such position that it is ready for the first folding and the operation of the parts is so timed that as soon as the blank comes to rest the anvil stand rises from the full line position in Figure 11, to the dotted line position in said figure. Correspondingly the ends of the blank are bent upward from full to dotted line position, thus forming a U-shaped structure which, when the folders move down, springs slightly apart at its upper ends as illustrated in Figure 12.

Figure 7:
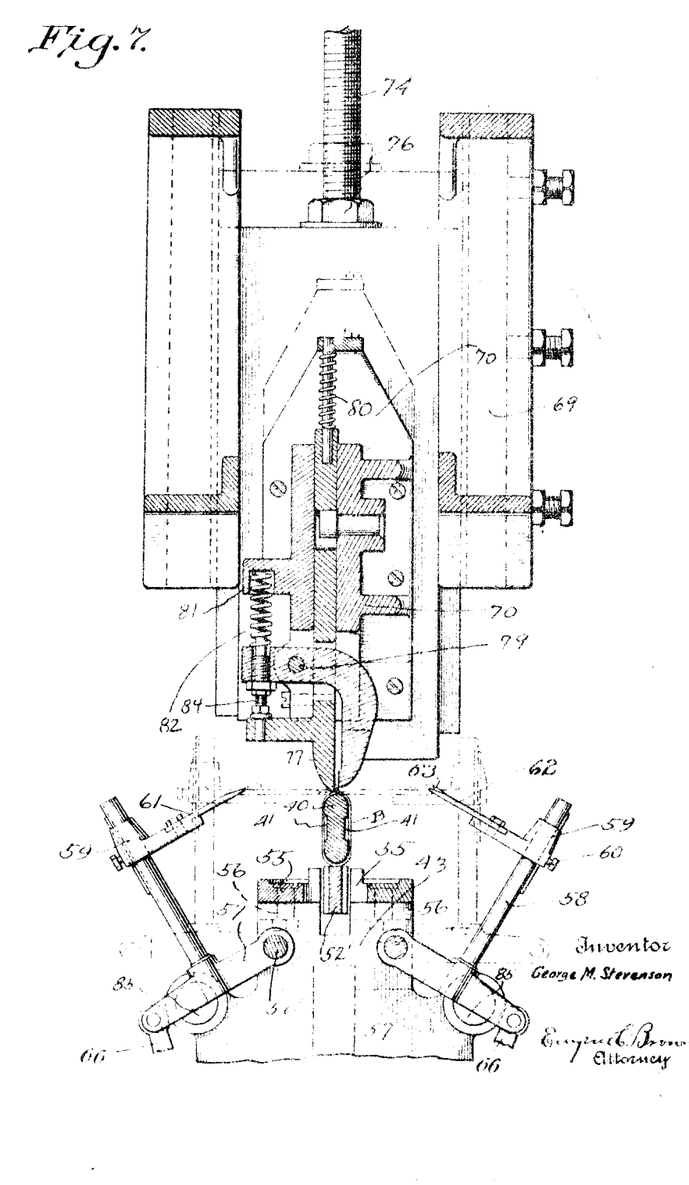
Fig. 7 is a section on line 7—7 of Fig. 1.

Swingingly supported on shafts 56' carried by the under frame (see Fig. 7), is a pair of rocker arms 57 and each arm carries a pair of upwardly extending posts 58 whereon is slidably mounted a blade carrying head 59, the head being capable of adjustment longitudinally of the posts and locked in adjusted position by a set screw 60. On one side of the machine there is carried by the head a single blade 61, while on the other side the head 59 supports a pair of blades 62 and 63, the two blades equaling in length the single blade 61. The blade 62 is positioned at the first station on the blank, while the blade 63 is positioned at the second station of the blank (see Fig. 13), the blade 61 thus covering both stations. Now, these blades and the supporting members are so arranged that lifting of the free ends of the arms 57 brings the blades nearly together over the top of the horn. As before noted, horns of different sizes may be used and the adjustable feature of the heads 59, is for the purpose of regulating the position of the blades in accordance with the size of the horn employed. In order to operate these blades, there is supported by the under frame a guide 64, arranged vertically and having slidably mounted therein, a crosshead 65, which is connected by links 66 with the free ends of the rocker arms 57 (see Fig. 27). This crosshead is also connected by the pitman or connecting rod 67 with the crank of a crank disk 68 fixed to the shaft 16.

Now, the timing of the parts so far described is as follows:

After the folders have moved up as shown in Figure 11 and dropped back, the crosshead 65 is moved up so that the blades swing toward each other, the blade 61 catching under the edge $b$ of the blank while, the blade 62 catches under the edge of $b'$. This movement of the arms and blades can be well seen by reference to Figure 14, after the blank is forced over the horn the part $b'$ tends to straighten out to a slide extension so that the part $b^2$ slips over the part $b$ and the parts are so arranged that in this condition the parts $b$ and $b^2$ are frictionally held.

Figures 13, 14, 15, 16, 17, 18:
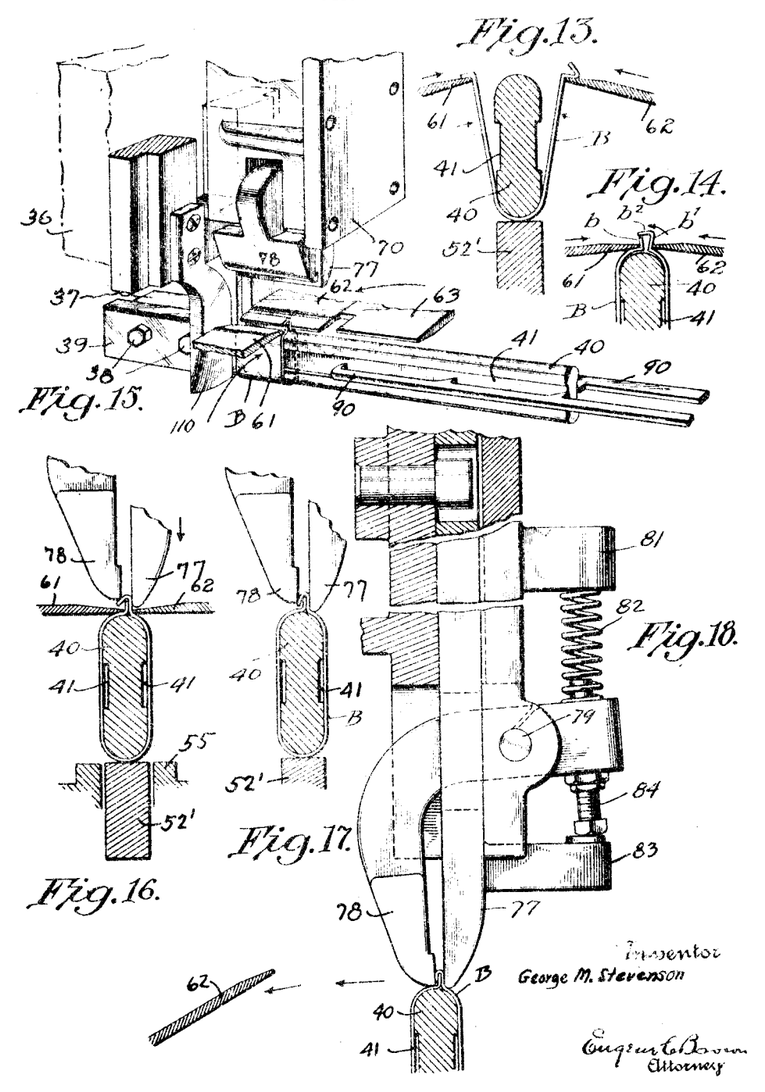
Fig. 13 is a detail showing the wings coming into contact with a blank.
Fig. 14 is a view showing the wings closing the blank and interlocking the bent tongue of the blank.
Fig. 15 is a fragmentary perspective view of the forming mechanism showing a blank in position after the wings have completed the interlocking operation.
Fig. 16 is a detail showing the same condition as above but with the pincher jaws lowered to just contact with the upstanding edges of the blank.
Fig. 17 is a detail showing how the pincher jaws have descended further and folded over the V-shaped edge of the ferrule.
Fig. 18 details a still further downward movement of pincher jaw mounting, which causes the jaw to rock on pivot and tightly compress the folded edges over seam of the ferrule.

At the initial station the seam thus formed is also locked and this is accomplished by mechanism now to be described. Vertically slidable in the arch on a suitable guide 69 is a head 70. Pivoted to the arch is a lever 71 connected by a ball and socket joint with a pitman 72 having its lower end connected by a ball and socket joint with a crank disk fixed on the shaft 12 (see Figs. 5 and 28). The remaining arm of this lever is pivotally connected to the lower end of a screw 74 which, passes through a suitable boss or projection 75 on the head 70, being held in adjusted position by the nuts 76. Thus the head can be adjusted for height. Now, at the first station the lower end of this head supports a fixed jaw 77 which, is so positioned that upon depression of the head, which takes place just before the blades open, as shown in Figure 15, it engages the outer side of the portion $b'$ of the blank. Also there is pivoted to the head 70, a swinging jaw 78, this jaw forming a bent lever construction with one part substantially horizontal and the other vertical and the horizontal part being mounted on the pivot pin 79. Now, while the jaw 77 has been termed a fixed jaw to distinguish it from the swinging jaw, it still has a slight vertical movement in the head resisted by the spring 80 and the head itself is provided with an upper lug 81, between which and the horizontal end of the swinging jaw member is a spring 82 which normally holds the two jaws apart, the head having also a lower lug 83, and the horizontal arm of the swinging jaw carrying an adjusting screw 84 for limiting the extent of the opening of the two jaws.

Now, the timing of the movement of this head is such that the head begins to descend just before the blades start to open as shown in Figure 16. Immediately after the head has moved to bring the jaw in this position the head continues downward behind the lip $b^2$ as shown in Figure 17. The downward movement of the head permits a slight rise of the jaw 77 and at the same time the swinging jaw tilts forward as shown in Figure 18, thus, the two jaws act in a manner similar to a pair of pinchers and they are accordingly preferably termed the pincher slide and the pincher jaw. With the operation of these jaws, work on the ferrule at the first station ceases and it is then fed forward to the second station by mechanism now to be described.

Figures 8, 9, 10:
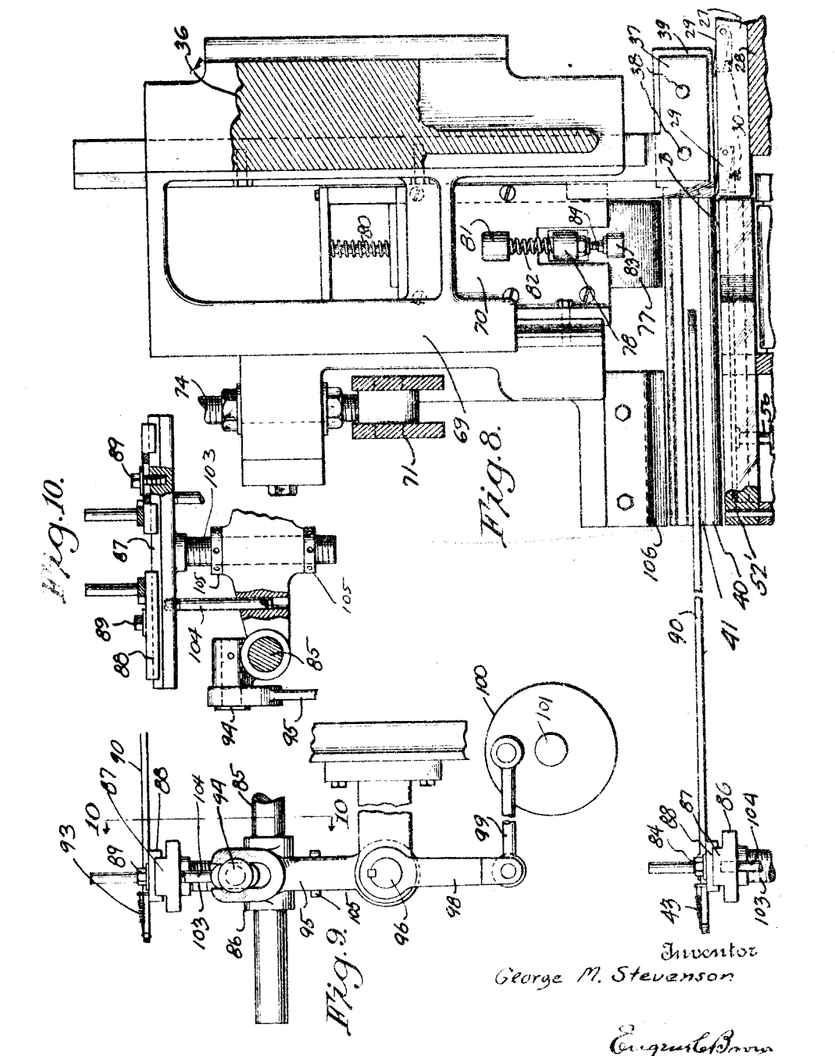
Fig. 8 is a side view opposite to that shown in Fig. 1, showing pull bars in place.
Fig. 9 is a detailed side view of operating means for pull bars.
Figure 10 is a detailed front view of the pull bar mount.

Extending forwardly from the main frame is a pair of side bars 85 whereon is slidably mounted a crosshead 86 (see Figs. 8 to 10 and 27) carrying on its upper surface a guide rib 87, whereon is mounted a pair of slides 88 held in adjusting position by suitable screws 89. Pivoted to the inner end of each slide is a lever having a long arm 90, which extends rearwardly and is provided on its inner end with inwardly fixed ratchet teeth 91 (see Fig. 3), which engage in the groove of the respective side of the horn. These levers have their rear ends urged together by a spring 92 and project forwardly from the pivot points to provide short arms connected by the springs 93 with the respective slides. Preferably these levers are termed pull bars because, after the crosshead 86 reciprocates, the pull bars pass rearwardly over the partly finished ferrules and then forwardly to pull them from one station to the other. The purpose of the slides is to permit the necessary adjustment for different ferrules, the thicker the brush handle to which the ferrule is to be applied the wider the horn and the farther apart are the slides 88. In order to reciprocate the crosshead 86, there is provided on each side a laterally projecting pin 94, which is engaged by the forked end of a rock arm 95, fixed upon a rock shaft 96, mounted in suitable bearings 97 at the front of the machine. On this rock shaft is also a rock arm 98, which is connected by a pitman 99 with a crank disk 100, mounted on a shaft 101 driven from the shaft 12 by suitable gearing such as is shown by the sprocket chain 102. It will be noted by reference to Figures 9 and 10, that a vertical adjustment is provided in connection with the crosshead, the upper part of the crosshead carrying the slides being connected to the lower part by a screw 103 and guide pins 104, the screw having suitable nuts 105 to permit its vertical adjustment in the lower part of the crosshead. In this way the pull bars may be raised or lowered in accordance with the size of the ferrule being made at the time and the variation in the size of the horn. It will be obvious that the timing of the operation of these pull bars is such that partly formed ferrules are drawn forward in the intervals between the actions of the different seam forming devices.

Figures 19, 20:
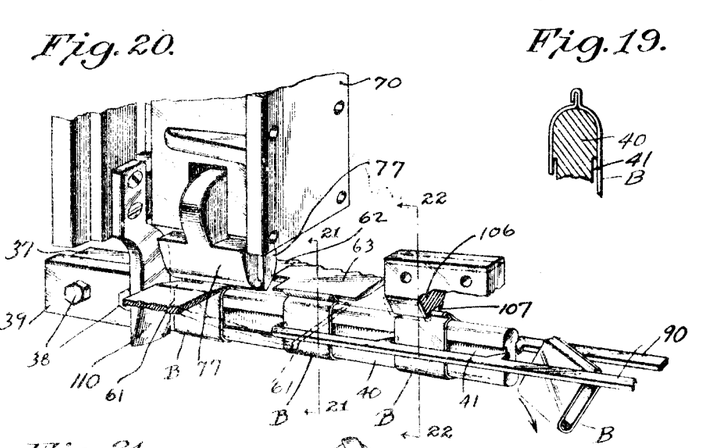
Fig. 19 is a detail view showing the condition of the seam on the ferrule after the pincher jaw and slide have been released.
Fig. 20 is a fragmentary perspective view of the forming mechanism with the pincher jaw and slide in the same position as that detailed in Fig. 16.
Figures 21, 22, 23, 24, 25:
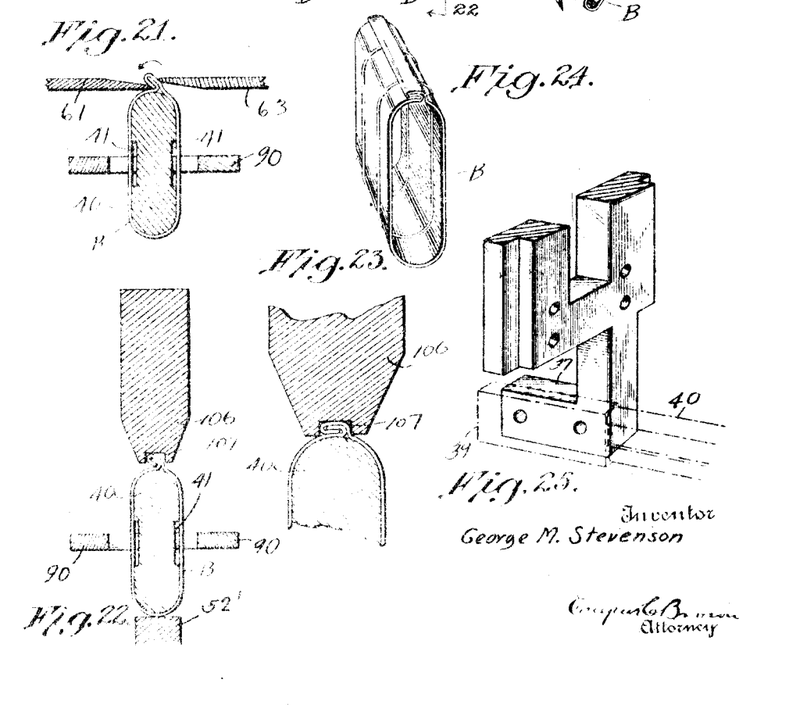
Fig. 21 is a section on line 21—21 of Fig. 20.
Fig. 22 is a section on line 22—22 of Fig. 20.
Fig. 23 is an enlarged detail section showing the final movement of the hammer steel and the completed seam on ferrule.
Fig. 24 is a perspective view of a completed ferrule.
Fig. 25 is a perspective view of the lower portion of the rear slide showing means of attaching various sizes of horns.

After the partly formed ferrule with its crimped seam has been moved to the second station it is again acted upon by the blades of the wings, in this case the forward end of the wing 61 acting in conjunction with the blade or wing 63 and it will be noted that, while the wings 61 and 62 are beveled on the upper surfaces so that the edges come into alinement, the wing 63, is beveled from beneath so that it tends to ride over the wing 61. Now, this arrangement produces a peculiar effect on the partly formed seam which, as the ferrule takes position in the second station, is in the form shown in Figure 19. After it rests in this position another blank has been brought into the first station and as the operation of the device proceeds, the wings again approach each other and engage the partly formed seam, the wing 63 bending it over in connection with the wing 61 as in Figure 21. Now, attached to the head or pincher housing is a hammer steel 106 having a groove or slot 107. The hammer steel rises and falls with the head. After the partly formed seam has been bent over as in Figure 21, the ferrule, in its nearly finished condition is again drawn forward on the horn by the pull bars to the third station and upon the next reciprocation of the pincher housing or head, the hammer steel descends on its partly formed seam as shown in Figure 22, and flattens it out as shown in Figure 23, thereby completing the ferrule. The next reciprocation of the pull bars draws the completed ferrule over the horn where it may be caught in a suitable receptacle. It is to be particularly noted that three blanks are being operated on simultaneously, the work being done at the several stations at the same time so that the machine, is, in its effect on production, the equivalent of three separate machines but, by reason of the internal action of the various elements, greatly simplifies the mechanisms necessary in three separate machines and at the same time eliminating the handling of the partly formed ferrules by transferring from one machine to another as well as increasing the speed of production.

Figures 5, 6, 26:
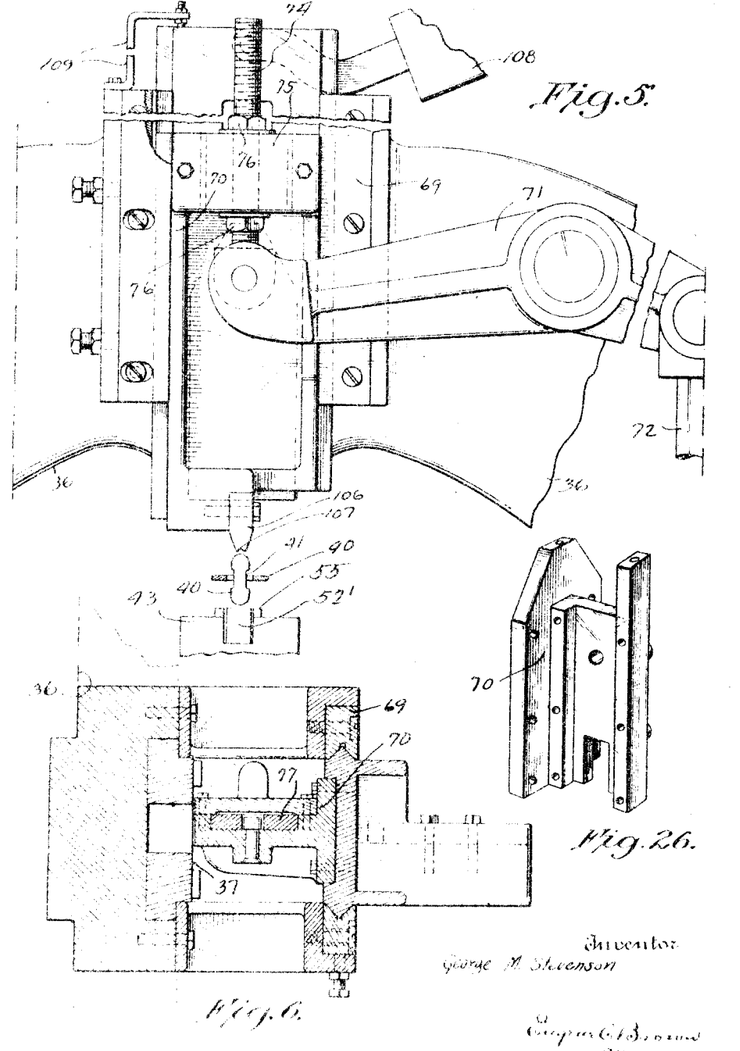
Fig. 5 is a front view of pincher housing showing means for raising and lowering the hammer-head and its counter-weight.
Fig. 6 is a section on line 6—6 of Fig. 1.
Fig. 26 is a perspective view of the pincher mount or housing with the pincher jaw and slide removed.

By reference to Figure 5 it will be seen that a counterweight 108 is employed for the horn slide and a limit stop 109 is also used in this connection. Furthermore, in order to properly ensure positioning of the wings in their relation to the blanks, certain guides 110 are so arranged that after the wings swing into pinching position they move forward slightly this arrangement being clearly shown in Figure 15.

Engineers and others skilled in this art will readily understand that changes and modifications may be made in the exact construction without departing from the essence of the invention. Accordingly it is to be understood that the present disclosure merely illustrates one typical form and it is intended that all forms of the mechanisms as well as the methods of manufacture will be fully commensurate with the scope of the claims.

Having thus described the invention, what is claimed as new, is:

1. The steps in the process of forming ferrules for paint brush handles and the like which consist in preparing the ends of a blank for interlocking engagement, doubling the blank centrally of its length to bring the prepared ends into proximity, and moving the prepared ends into interlocking frictionally self-held engagement.

2. The steps in the process of forming ferrules for paint brush handles and the like which consist in preparing the ends of a blank for interlocking engagement, doubling the blank centrally of its length to bring the prepared ends into proximity, moving the prepared ends into interlocking frictionally self-held engagement, and crimping the interlocked portions together.

3. The steps in the process of forming ferrules for paint brush handles and the like which consists in preparing the ends of a blank for interlocking engagement, doubling the blank centrally of its length to bring the prepared ends into proximity, moving the prepared ends into interlocking frictionally self-held engagement, crimping the interlocked portions together, and bending the interlocked and crimped portions to one side.

4. The steps in the process of forming ferrules for paint brush handles and the like which consist in preparing the ends of a blank for interlocking engagement, doubling the blank centrally of its length to bring the prepared ends into proximity, moving the prepared ends into interlocking frictionally self-held engagement, crimping the interlocked portions together, bending the interlocked and crimped portions to one side, and flattening the interlocked, crimped and bent portions on the adjacent portions of the ferrules.

5. In a machine for forming ferrules, a blank feeding mechanism, a blank doubling mechanism to which the feeding mechanism delivers the blanks successively, and a blank end interlocking mechanism operating to interlock the ends of the doubled blanks into frictionally self-held position.

6. In a machine for forming ferrules, a blank feeding mechanism, a blank doubling mechanism to which the feeding mechanism delivers the blanks successively, a blank end interlocking mechanism for interlocking the end of the doubled blanks, a pincher mechanism for laterally pinching the interlocked portions of the blanks together, and means to effect successive timed operation of the doubling and pinching mechanisms.

7. In a machine for forming ferrules, a blank feeding mechanism, a blank doubling mechanism to which the feeding mechanism delivers the blanks successively, a blank end interlocking mechanism for interlocking the end of the doubled blanks, a pincher mechanism for pinching the interlocked portions of the blanks together, bending means to bend the interlocked and pinched portions of the blanks to one side, and means to effect feeding of the interlocked and pinched blanks to the bending means.

8. In a machine for forming ferrules, a blank feeding mechanism, a blank doubling mechanism to which the feeding mechanism delivers the blanks successively, a blank end interlocking mechanism for interlocking the end of the doubled blanks, a pincher mechanism for pinching the interlocked portions of the blanks together, bending means to bend the interlocked and pinched portions of the blanks to one side, means to effect feeding of the interlocked and pinched blanks to the bending means and means to effect timed operation of the doubling, the interlocking, the crimping, the feeding and the bending of said blanks.

9. In a machine for forming ferrules, a blank feeding mechanism, a blank doubling mechanism to which the feeding mechanism delivers the blanks successively, a blank end interlocking mechanism for interlocking the end of the doubled blanks, a pincher mechanism for pinching the interlocked portions of the blanks together, bending means to bend the interlocked and pinched portions of the blanks to one side, and means to effect flattening of the portions bent to one side of the bodies of the blanks.

10. In a machine for forming ferrules, a blank feeding mechanism, a blank doubling mechanism to which the feeding mechanism delivers the blanks successively, a blank end interlocking mechanism for interlocking the end of the doubled blanks, a pincher mechanism for pinching the interlocked portions of the blanks together, bending means to bend the interlocked and pinched portions of the blanks to one side, means to effect flattening of the portions bent to one side of the bodies of the blanks, and means to effect feeding of the crimped blanks to the bending means and form the latter to flattening means in successive steps 11. In a machine for forming ferrules, a blank feeding mechanism, a blank doubling mechanism to which the feeding mechanism delivers the blanks successively, a blank end interlocking mechanism for interlocking the end of the doubled blanks, a pincher mechanism for pinching the interlocked portions of the blanks together, bending means to bend the interlocked and pinched portions of the blanks to one side, means to effect flattening of the portions bent to one side of the bodies of the blanks, means to effect feeding of the crimped blanks to the bending means and form the latter to flattening means in successive steps, and driving means operatively connected to the aforesaid means for simultaneously affecting the operation of the doubling and interlocking means on one blank, the bending means of the previously interlocked blank, and the flattening means of the previously bent blank.

12. In a machine of the class described, a vertically slidable anvil stand, and means to move said stand vertically and including a cam shaft, a cam member keyed to said shaft and having a dwell portion, a second cam member similarly formed and rotatable upon said shaft whereby to shift the dwell portion of one cam member with respect to the dwell portion of the other, and means to secure said cam members in adjusted position.

13. In a device of the kind described, a folding mechanism comprising a pair of pivotally mounted arms, rods extending upwardly from said arms, folder heads slidably mounted on said rods, and means to secure said heads in adjusted position on said rods.

In testimony whereof I affix my signature.

GEORGE M. STEVENSON.